(12) United States Patent
Rushton et al.

(10) Patent No.: US 10,336,348 B2
(45) Date of Patent: Jul. 2, 2019

(54) BRACKET

(71) Applicant: Perpetuum Ltd., Southampton (GB)

(72) Inventors: Guy Rushton, Southampton (GB); Adam Wasenczuk, Southampton (GB)

(73) Assignee: Perpetuum Ltd., Southampton (GB)

( * ) Notice: Subject to any disclaimer, the term of this patent is extended or adjusted under 35 U.S.C. 154(b) by 0 days.

(21) Appl. No.: 15/574,682

(22) PCT Filed: May 17, 2016

(86) PCT No.: PCT/EP2016/060966
§ 371 (c)(1),
(2) Date: Nov. 16, 2017

(87) PCT Pub. No.: WO2016/184835
PCT Pub. Date: Nov. 24, 2016

(65) Prior Publication Data
US 2018/0134304 A1 May 17, 2018

(30) Foreign Application Priority Data
May 18, 2015 (GB) .................................. 1508516.0

(51) Int. Cl.
*F16M 11/00* (2006.01)
*B61D 43/00* (2006.01)
*F16B 5/04* (2006.01)
*F16B 5/07* (2006.01)

(52) U.S. Cl.
CPC .............. *B61D 43/00* (2013.01); *F16B 5/045* (2013.01); *F16B 5/07* (2013.01)

(58) Field of Classification Search
CPC ..................................................... F04D 29/681
See application file for complete search history.

(56) References Cited

U.S. PATENT DOCUMENTS 1,344,945 A  6/1920  Hartmann
1,344,946 A  6/1920  Hartmann
(Continued)

FOREIGN PATENT DOCUMENTS

DE     29500504.1    3/1995
DE     202005007796  9/2005
(Continued)

OTHER PUBLICATIONS

EP Search and Examination Report dated Nov. 17, 2015; 8 pages.
PCT Search and Examination Report dated Jul. 22, 2016; 11 pages.

*Primary Examiner* — Amy J. Sterling
(74) *Attorney, Agent, or Firm* — Colin P. Cahoon; Samie S. Leigh; Carstens & Cahoon, LLP

(57) ABSTRACT

The invention provides a bracket for mounting external equipment to the underside of rolling stock, the bracket comprising first and second plates, and at least one joining member disposed between the first and second plates; wherein the joining member(s) are joined to the first plate by a plurality of joints and joined to the second plate by a plurality of joints. The invention also provides a rolling stock assembly comprising a bracket, a method for mounting external equipment to an underside of rolling stock, and a method for manufacturing a bracket for mounting external equipment to the underside of rolling stock.

21 Claims, 3 Drawing Sheets

(56) References Cited

U.S. PATENT DOCUMENTS

| | | | | |
|---|---|---|---|---|
| 3,646,635 A | * | 3/1972 | Stermac | E05D 7/04 |
| | | | | 16/239 |
| 4,396,135 A | | 8/1983 | Lundgren | |
| 6,983,831 B2 | * | 1/2006 | Beri | F16D 65/08 |
| | | | | 188/250 B |
| 2007/0177349 A1 | * | 8/2007 | Pokharna | F04D 29/681 |
| | | | | 361/696 |

FOREIGN PATENT DOCUMENTS

| EP | 0183395 | 6/1986 |
|---|---|---|
| GB | 190301956 | 4/1903 |
| KR | 10-2012-0108689 | 10/2012 |

\* cited by examiner

FIG. 3    SECTION A-A

BRACKET

CROSS-REFERENCE TO RELATED APPLICATIONS

This application is a US 371 application from PCT/EP2016/060966 filed May 17, 2016, which claims priority to GB Application 1508516.0 filed May 18, 2015, the technical disclosures of which are hereby incorporated herein by reference.

TECHNICAL FIELD

The invention relates to a bracket for mounting external equipment to the underside of rolling stock, to a rolling stock assembly comprising a bracket, to a method for mounting external equipment to an underside of rolling stock, and to a method for manufacturing a bracket for mounting external equipment to the underside of rolling stock.

BACKGROUND OF THE INVENTION

Rolling stock (vehicles used on a railway, including any type of locomotive, carriage or wagon) is subject to shock and vibration generated from the continuous contact between wheels and rails, both of which have imperfect contact surfaces. In some cases it may be considered desirable to generate electricity from this vibration and/or to measure shock and vibration. To this end, electromechanical generators and/or sensor modules may be mounted to the underside of rolling stock, for example to an axle box, from which energy may be harvested and/or from which data may be collected. This equipment, in order to harvest sufficient energy, must have a minimum mass and reaction force on the part to which it is mounted. Any bracket used to attach this equipment to the rolling stock should be light, stiff, strong, resistant to fatigue, have a suitable resonant frequency, and be cost effective to manufacture and install.

INVENTION DISCLOSURE

The invention provides a bracket for mounting external equipment to the underside of rolling stock that meets these requirements.

A first aspect of the invention provides a bracket for mounting external equipment to the underside of rolling stock, the bracket comprising first and second plates, and at least one joining member disposed between the first and second plates; wherein the joining member(s) are joined to the first plate by a plurality of joints and joined to the second plate by a plurality of joints.

The bracket of the first aspect of the invention is a box bracket that provides a light, strong, stiff and cost effective fitting for mounting external equipment to the underside of rolling stock.

Rolling stock includes any type of locomotive, carriage or wagon.

The external equipment may comprise any component or system that is required to be attached externally to the underside of rolling stock, including to the un-sprung mass, including any type of sensor. In particular, the external equipment may comprise at least one of an electromechanical generator and a vibration sensor.

A single joining member may be joined to the first plate by a plurality of joints and joined to the second plate by a plurality of joints. However, in embodiments in which multiple joining members are employed, one, some or all of the joining members may be joined to the first plate by only a single joint and joined to the second plate by only a single joint.

The joints may be riveted joints. Preferably the riveted joints comprise cold formed riveted joints, that is joints formed by applying a continuous force to a protrusion located within a corresponding aperture formed in another part at ambient temperature. By employing cold formed riveted joints, stress and fatigue of the first and second plates and the joining members may be minimised, and the joints may have high fatigue resistance. However, other riveting techniques are also possible, for example hot riveting and/or impact riveting.

The or each joining member may comprise one or more protrusions received in respective apertures provided in the first plate, and one or more protrusions received in respective apertures provided in the second plate. Preferably, each protrusion forms a riveted joint, for example a cold formed riveted joint, with its respective aperture. Alternatively, one, some or all of the protrusions may form glued joints or friction-fit joints within their respective apertures. Alternatively one, some or all of the protrusions may form bolted joints with their respective apertures, for example with a nut retained on a threaded outer surface of the protrusion.

In alternative embodiments, the first and second plates may comprise protrusions that are received in respective apertures provided in the joining member(s).

The protrusions may comprise planar tabs and/or circular protrusions. A combination of planar tabs and circular protrusions may be provided on the same joining member. Alternatively, one, some or all of the joining members may only include protrusions in the form of planar tabs or protrusions in the form of circular protrusions. One, some or all of the protrusions may have radiused corners at the interface between the protrusion and a main body of a joining member to improve fatigue resistance.

The apertures may comprise slots and/or circular holes. A combination of planar slots and circular holes may be provided in the first plate and/or in the second plate. One, some or all of the apertures may have radiused corners and/or ends to improve fatigue resistance.

The bracket may further comprise one or more spacers disposed between the first and second plates, the spacers being in compression between the first and second plates. The spacers are provided in addition to the joining member(s), and preferably do not have any protrusions received in any apertures formed in the first and second plates.

The bracket may further comprise one or more bolt assemblies connecting the first plate to the second plate, the bolt assemblies being in tension between the first and second plates. One or more of the bolt assemblies may, in use, mount external equipment to the bracket. One or more of the bolt assemblies may, in use, mount the bracket to the underside of rolling stock, or to a component or system adapted to be mounted to the underside of rolling stock. However, one or more bolt assemblies may additionally, or alternatively, be provided that serve simply to connect the first plate to the second plate. In addition, one or more bolt assemblies may additionally, or alternatively, be provided that serve simply to mount external equipment to the bracket or the bracket to the underside of rolling stock without passing through both the first and second plates.

The bolt assemblies may provide the bracket with its stiffness, with the joining member(s) serving simply to hold the bracket together until the bolt assemblies are inserted through the bracket and tightened. However, in some embodiments the joining member(s) may contribute significantly to the overall stiffness of the bracket.

The spacers may be arranged to directly transmit compressive loads generated by the tightened bolts. The spacers also may also act to increase the stiffness of the joints formed by the bolt assemblies with the first and second plates, and help to prevent distortion of the bolt assemblies.

One or more of the spacers may comprise an annular spacer with a bolt forming part of one of the bolt assemblies passing therethrough.

The first and second plates may be substantially planar. Alternatively, one or both of the first and second plates may be curved. Alternatively, one or both of the first and second plates may have a sharp or curved bend or kink separating first and second plate portions.

The first and second plates may be substantially parallel. Alternatively, the second plate may be arranged at an angle to the first plate.

The region between the first and second plates may generally be empty except for the joining member(s), spacers and bolt assemblies. However, in some embodiments, some or all of the free space between the first and second plates may be filled, for example with a foam.

The first and second plates may be substantially identical.

The first and second plates are preferably each formed as single unitary parts. However, in some embodiments one or both of the first and second plates may be formed of two or more separate parts joined together, for example by being welded, riveted or bolted together. The first and second plates are preferably formed of mild steel, but may alternatively be formed of another metal, for example stainless steel or aluminium, or even a composite material. In some embodiments at least one of the plates may be formed as a laminate structure.

The first and second plates are preferably at least 1 mm thick but less than 10 mm thick, and more preferably at least 2 mm thick but less than 6 mm thick, although other thicknesses are possible. The above-described box structure allows a stronger, stiffer, lighter bracket to be formed using plates of reduced thickness compared to the thickness required for a typical solid bracket.

In some embodiments the bracket may comprise one or more further plates in addition to the above-described first and second plates and joining member(s), for example a third plate located between the first and second plates or outside the first and second plates. Alternatively a third plate may be located adjacent a first one of the first and second plates such that the third plate does not overlap with the first one of the first and second plates when viewed in a direction perpendicular to the third plate, but both the third plate and the first one of the first and second plates overlap with the other one of the first and second plates. In the latter case, the third plate may lie in the same plane as the first one of the first and second plates. Alternatively the third plate may be angularly offset from the first one of the first and second plates and/or spaced apart from the first one of the first and second plates in a direction perpendicular to the third plate. The further plate(s) may be connected to one or both of the first and second plates via the joining member(s), or by further joining member(s). However, for lightness and simplicity, it is preferred that the bracket does not comprise any further plates in addition to the first and second plates and joining member(s).

The joining member or at least one of the joining members may be arranged substantially perpendicularly to one or both of the first and second plates.

The joining member or at least one of the joining members may be substantially planar, or include at least one substantially planar portion. A single joining member may include a plurality of planar portions connected by bent and/or curved portions. Alternatively one, some or all of the joining members may have cylindrical bodies with a single protrusion at each end.

One, some or all of the planar joining member(s) or planar portion(s) of the joining member(s) may be arranged to be at a non-zero angle to the horizontal when the bracket is installed on rolling stock. By arranging the planar portions at a non-zero angle water accumulation in the bracket may be prevented, thereby minimising the risk of corrosion of the bracket. The planar joining member(s) or planar portion(s) of the joining member(s) may each be at different non-zero angles.

The joining members are preferably formed of a metal, for example mild steel, stainless steel or aluminium, and may be formed of the same material as the first and second plates. The joining members may have the same thickness as the first and second plates, although other thicknesses are possible.

The bracket may comprise a first set of apertures formed in at least one of the first and second plates for attachment of external equipment to the bracket. The first set of apertures may, for example, comprise a plurality of pairs of circular and/or slotted holes formed in each of the first and second plates. The first set of apertures may, for example, be arranged in a square pattern or arranged along an arc. The first set of apertures may be adapted for receiving bolt assemblies as described above. Alternatively, external equipment may be mounted to the bracket in any other way.

The bracket may comprise a second set of apertures formed in at least one of the first and second plates for attachment of the bracket to the underside of rolling stock, or to a component or system adapted to be mounted to the underside of rolling stock. The second set of apertures may, for example, comprise a plurality of pairs of circular and/or slotted holes formed in each of the first and second plates. The second set of apertures may, for example, be arranged in a square pattern or arranged along an arc. In particular, the second set of apertures may be arranged along an arc for attachment of the bracket to a bearing cover plate of an axle box, although other aperture patterns for attachment to other portions of the underside of rolling stock are also possible. The second set of apertures may be adapted for receiving bolt assemblies as described above. Alternatively, the bracket may be mounted in any other way.

The bracket may have a resonant frequency of at least 350 Hz. Preferably the bracket has a resonant frequency of at least 500 Hz, more preferably of at least 750 Hz, and most preferably of at least 1000 Hz. A bracket having a resonant frequency of at least 350 Hz generally avoids resonance, which could otherwise fatigue and damage the bracket and any external equipment mounted to it. A bracket having a resonant frequency of at least 350 Hz may also avoid interfering with the measurements generated by the generator/sensor module. The resonant frequency may generally be increased by making the bracket lighter and stiffer.

A second aspect of the invention provides a rolling stock assembly comprising a bracket according to the first aspect of the invention mounted to the underside of rolling stock, or to a component or system adapted to be mounted to the underside of rolling stock. The bracket may, for example, be mounted to the un-sprung mass of rolling stock, for example to an axle box. The bracket may, especially, be mounted to a bearing cover plate.

The rolling stock assembly may further comprise external equipment mounted to the bracket. As described above, the external equipment may comprise an electromechanical generator and/or a vibration sensor or another type of sensor. The external equipment may be mounted to the bracket either before or after the bracket is mounted to the underside of rolling stock, or to a component or system adapted to be mounted to the underside of rolling stock.

One, some or all of the planar joining member(s) or planar portion(s) of the joining member(s) may be at a non-zero angle to the horizontal when the rolling stock is on flat, level ground.

A third aspect of the invention provides a method for mounting external equipment to an underside of rolling stock, the method comprising fitting a bracket according to the first aspect of the invention to the underside of the rolling stock, and fitting external equipment to the bracket. The external equipment may be fitted to the bracket either before or after the bracket has been fitted to the underside of the rolling stock. The bracket may include any features or combination of features described above in relation to the first aspect of the invention.

A fourth aspect of the invention provides a method for manufacturing a bracket for mounting external equipment to the underside of rolling stock, the method comprising the steps of a) providing a first plate and a second plate, and at least one joining member disposed between the first and second plates, b) locating protrusions of the at least one joining member within respective apertures provided in the first plate and the second plate, and c) attaching the protrusions to the first and second plates to form an assembled bracket.

The step of attaching the protrusions to the first and second plates may comprise deforming ends of the protrusions while the protrusions are located within their respective apertures to form riveted joints between the joining member(s) and the first plate and between the joining member(s) and the second plate. Preferably the method comprises cold forming the protrusions to form cold formed riveted joints.

The method may further comprise the additional steps required to assemble a bracket or rolling stock assembly as described above. The bracket may include any features or combination of features described above in relation to the first aspect of the invention.

The first and second plates and/or the joining members may be laser cut or water jet cut.

BRIEF DESCRIPTION OF THE DRAWINGS

Non-limiting embodiments of the invention will now be described with reference to the accompanying drawings, in which:

FIGS. 2 and 3 illustrate front and side views of the bracket of FIG. 1 in isolation;

DETAILED DESCRIPTION OF THE PREFERRED EMBODIMENTS

Figure 1:
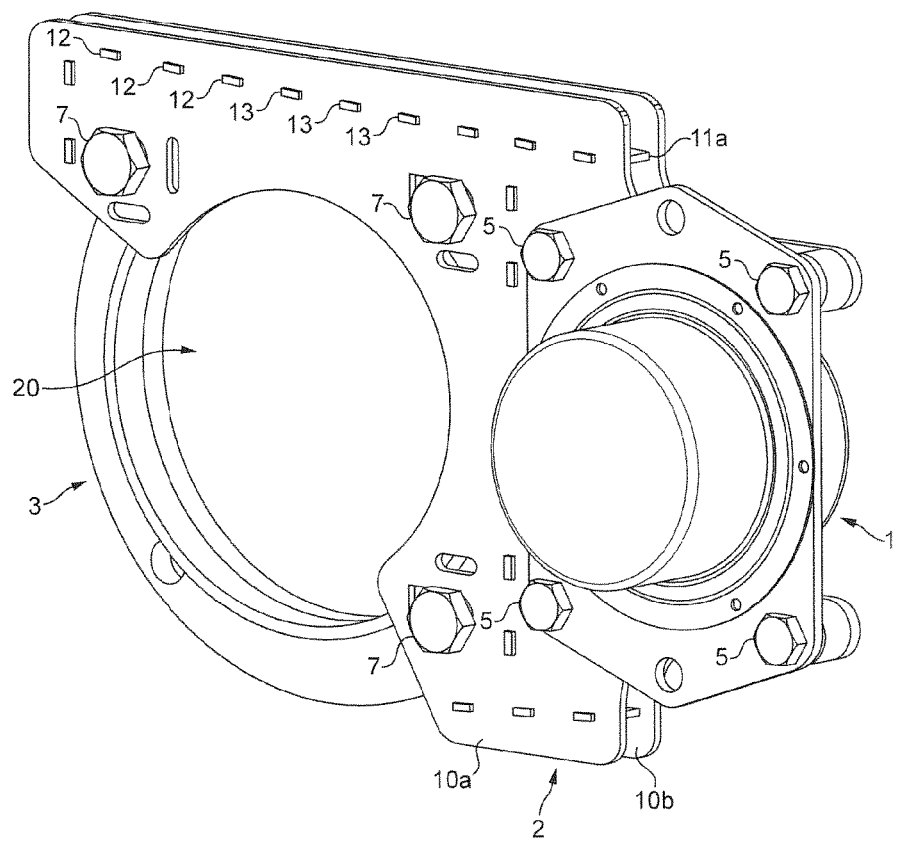
FIG. 1 illustrates a bracket in accordance with the invention.
Figure 2:
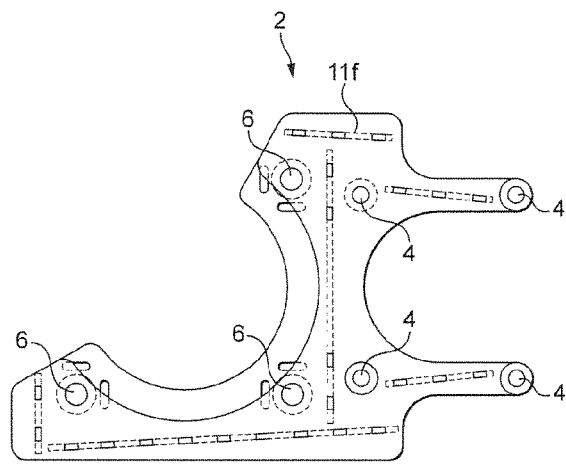

FIGS. 1 to 4 illustrate a bracket 2 in accordance with the invention. The bracket may be used to mount external equipment 1 for example a generator/sensor module having an integral mounting plate to a bearing cover plate 3 of rolling stock, as shown in FIG. 1.

For clarity, the bracket 2, external equipment 1 and bearing cover plate 3 are shown in isolation in FIG. 1, although it will be appreciated that the bearing cover plate 3 may be mounted to an axle box of rolling stock such that the external equipment 1 is mounted to the underside of the rolling stock via the bracket 2. In other embodiments the bracket may be mounted to, or adapted to be mounted to, another part of an underside of rolling stock, especially to another part of the un-sprung mass of rolling stock.

The bracket 2 comprises first and second planar, parallel metal plates 10a, 10b, each having a thickness of 3 mm. The first and second plates 10a, 10b are substantially identical, and differ only in the radius of a large opening 20 formed in each of the first and second plates 10a, 10b for receiving an axle of rolling stock to which the bracket may be mounted. The bracket further comprises a plurality of joining members 11a to 11f disposed between the first and second plates 10a, 10b which attaching the first and second plates 10a, 10b together.

Each joining member 11a to 11f is in the form of a 3 mm thick planar sheet of metal having a first longitudinal edge facing towards or abutting the first plate 10a and a second longitudinal edge facing towards of abutting the second plate 10b. Each joining member comprises a plurality of projections 12 in the form of planar tabs protruding its first edge, each of which is received in a respective aperture 13 in the form of a slot formed in the first plate 10a; and a plurality of projections 12 in the form of planar tabs protruding its second edge, each of which is received in a respective aperture 13 in the form of a slot formed in the second plate 10b. Each protrusion 12 has been cold formed to form a riveted joint at its respective aperture 13. Each projection 12 effectively forms a tight, compressed mortise and tenon joint with its respective aperture 13. In this way, the joining members 11a to 11f connect the first and second plates 10a, 10b together and act to strengthen and stiffen the bracket 2, especially before the bracket has been installed with bolt assemblies passing therethrough and tightened, as described below. Each joining member 11a to 11f is arranged substantially perpendicularly to the first and second plates 10a, 10b.

Figure 4:
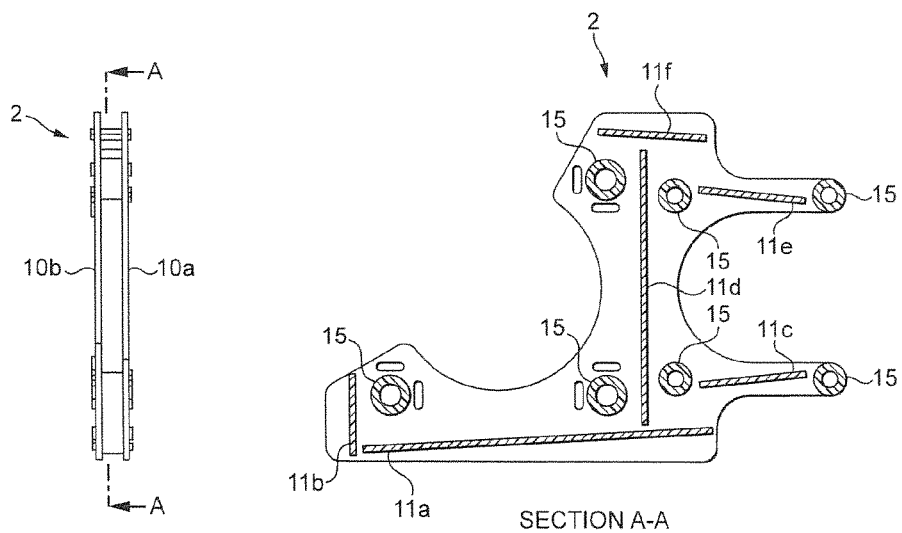
FIG. 4 illustrates a cross-section view of the bracket of FIG. 1 in isolation.

The joining members 11a to 11f are arranged such that when the bracket 2 is installed as intended on rolling stock the planar bodies of the joining members are at a non-zero angle to the horizontal, as shown most clearly in FIGS. 3 and 4. In this way the accumulation of water in the bracket 2 is minimised.

The bracket 2 has a first set of holes or apertures 4 formed in each of the first and second plates 10a, 10b for attachment of the external equipment 1 to the bracket 2 by a first set of bolt assemblies 5 passing through the integral flange of the external equipment 1. It will be appreciated that in other embodiments the hole pattern may be different, and that the external equipment 1 may not include an integral flange but may be mounted to the bracket 2 in another way. The bracket also has a second set of holes or apertures 6 formed in each of the first and second plates 10a, 10b for attachment of the bracket 2 to the bearing cover plate 3 by a second set of bolt assemblies 7. Again, it will be appreciated that in other embodiments the hole pattern may be different, and that the bracket 2 may be mounted to the underside of rolling stock, or to a component or system adapted to be mounted to the underside of rolling stock, in another way.

The bracket 2 further comprises a plurality of annular spacers 15 in addition to the joining members 11a to 11f disposed between the first and second plates 10a, 10b. Each annular spacer 15 is aligned with a respective pair of holes 4 of the first set formed in each of the first and second plates for mounting the external equipment 1 to the bracket 2, or with a respective pair of holes 6 of the second set formed in each of the first and second plates for mounting the bracket 2 to the bearing cover plate 3. Each pair of holes 4, 6 and its respective spacer 15 has a bolt assembly 5, 7 including a bolt and a nut passing through its centre. Each bolt assembly 5, 7 is tightened to be held in tension, acting to urge the first and second plates 10a, 10b together and mounting the external equipment 1 to the bracket 2 and the bracket 2 to the baring cover plate 3. The spacers 15 are held in tension and directly transmit the compressive loads generated by the bolt assemblies 5, 7. The spacers 15 also act to increase the stiffness of the joints formed by the bolt assemblies 5, 7 with the first and second plates 10a, 10b, and help to prevent distortion of the bolts.

When the external equipment 1 is mounted to the bracket 2 and the bracket 2 is mounted to the bearing cover plate 3 with all bolt assemblies 5, 7 tightened, the bracket has a resonant frequency of approximately 500 Hz. By having a resonant frequency above 350 Hz, the bracket generally avoids resonance, which could otherwise fatigue and damage not only the bracket 2 itself but also the external equipment 1 mounted to it. The bracket 2 also avoids interfering with vibration and shock measurements taken by the generator/sensor module.

Figure 5:
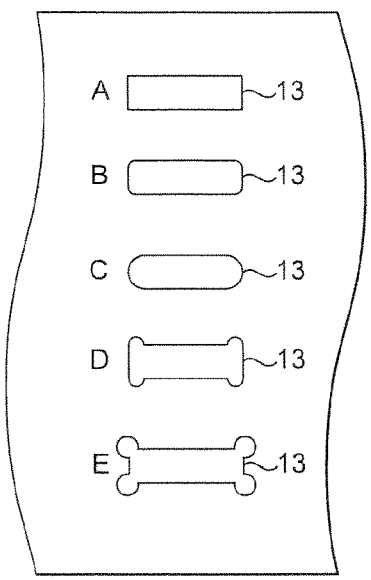
FIG. 5 illustrates alternative aperture geometries that may be used in embodiments of the invention.

A variety of different aperture geometries are possible for the apertures formed in the first and second plates. Examples of different possible aperture geometries are shown in FIG. 5. In particular, slot (D) has the advantage that when the joint is formed the lug material is expanded and forms a metal to metal contact in all directions, which is more efficient in transmitting load than relying on friction grip. Where loads are anticipated in only one direction a simpler form such as (C) is appropriate. The slot forms shown, with exception of (A) have radiused corners for improved fatigue performance. The apertures in the embodiment described above are in the form of slots shaped to receive flat lug type protrusions, and FIG. 5 shows alternative slot geometries. However, round holes are also possible, especially in embodiments in which the joining members have round protrusions instead of flat lugs.

Figure 6:
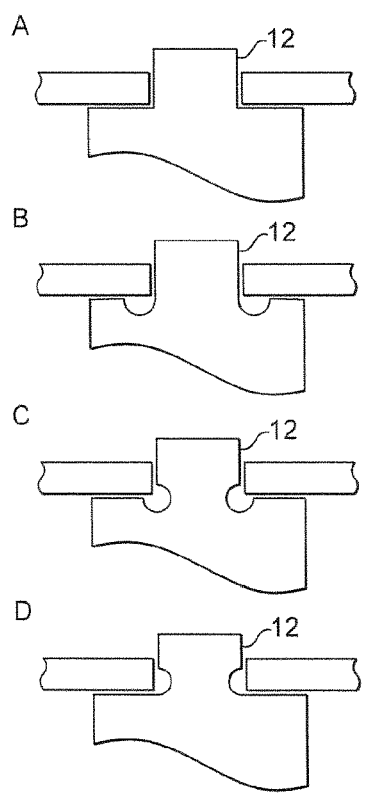
FIG. 6 illustrates alternative protrusion geometries that may be used in embodiments of the invention.

Similarly, a variety of different protrusion geometries are possible for the protrusions extending from the joining members. Again, a radius in the corner is desirable as a stress relief feature to minimise fatigue problems. A protrusion with no radius is shown in FIG. 6 (A), whereas some options for applying a stress relief radius are shown in FIG. 6 (B)-(D). The preferred version is (B).

The bracket 2 is manufactured by laser cutting or water jet cutting the first and second plates 10a, 10b having the plurality of apertures 13, laser cutting or water jet cutting the joining members 11a to 11f having the plurality of protrusions 12 extending from their first and second longitudinal edges, positioning the joining members 11a to 11f between the first and second plates 10a, 10b, arranging the protrusions 12 of the joining members 11a to 11f in the apertures 13 of the first and second plates 10a, 10b, and cold forming ends of the protrusions 12 while the protrusions are located within their respective apertures 13 to form cold formed riveted joints between the joining members 11a to 11f and the first and second plates 10a, 10b. The joining members 11a to 11f act to hold the bracket 2 together and provide the necessary stiffness, especially prior to installation of the bracket 2 with external equipment 1 on the underside of rolling stock before bolt assemblies have been inserted therethrough and tightened.

The foregoing description is intended to illustrate the invention and not limit the scope of the invention. Those skilled in the art will appreciate that various modifications are possible within the scope of the accompanying claims.

The invention claimed is:

1. A bracket for mounting external equipment to the underside of rolling stock, the bracket comprising first and second plates, a first set of apertures formed in at least one of the first and second plates for attachment of external equipment to the bracket and a second set of apertures formed in at least one of the first and second plates for attachment of the bracket to the underside of rolling stock, or to a component or system adapted to be mounted to the underside of rolling stock and the bracket further comprising at least one joining member disposed between the first and second plates; wherein the joining member(s) are joined to the first plate by a plurality of joints and joined to the second plate by a plurality of joints, wherein the joining member or at least one of the joining members is substantially planar, or includes at least one substantially planar portion.

2. A bracket according to claim 1, wherein the joints are riveted joints.

3. A bracket according to claim 1, wherein the or each joining member comprises one or more protrusions received in respective apertures provided in the first plate, and one or more protrusions received in respective apertures provided in the second plate.

4. A bracket according to claim 3, wherein the protrusions are selected from the group consisting of planar tabs, circular protrusions and combinations thereof.

5. A bracket according to claim 3, wherein the apertures are selected from the group consisting of slots, circular holes and combinations thereof.

6. A bracket according to claim 1, further comprising one or more spacers disposed between the first and second plates, the spacers being in compression between the first and second plates.

7. A bracket according to claim 1, further comprising one or more bolt assemblies connecting the first plate to the second plate, the bolt assemblies being in tension between the first and second plates.

8. A bracket according to claim 7, wherein the bracket further comprises one or more spacers disposed between the first and second plates, the spacers being in compression between the first and second plates, and the spacers are arranged to directly transmit compressive loads generated by the tightened bolts.

9. A bracket according to claim 8, wherein one or more of the spacers comprises an annular spacer with a bolt forming part of one of the bolt assemblies passing therethrough.

10. A bracket according to claim 1, wherein the first and second plates are substantially planar.

11. A bracket according to claim 1, wherein the first and second plates are substantially parallel.

12. A bracket according to claim 1, wherein the first and second plates are substantially identical.

13. A bracket according to claim 1, wherein the joining member or at least one of the joining members is arranged substantially perpendicularly to one or both of the first and second plates.

14. A bracket according to claim 1, wherein one, some or all of the planar joining member(s) or planar portion(s) of the joining member(s) are arranged to be at a non-zero angle to the horizontal when the bracket is installed on rolling stock.

15. A bracket according to claim 1, the bracket having a resonant frequency of at least 350 Hz.

16. A rolling stock assembly comprising a bracket mounted to the underside of rolling stock, or to a component or system adapted to be mounted to the underside of rolling stock, the bracket comprising first and second plates, a first set of apertures formed in at least one of the first and second plates for attachment of external equipment to the bracket and a second set of apertures formed in at least one of the first and second plates for attachment of the bracket to the underside of rolling stock, or to the component or system adapted to be mounted to the underside of rolling stock and the bracket further comprising at least one joining member disposed between the first and second plates; wherein the joining member(s) are joined to the first plate by a plurality of joints and joined to the second plate by a plurality of joints, wherein the joining member or at least one of the joining members is substantially planar, or includes at least one substantially planar portion.

17. A rolling stock assembly according to claim 16, further comprising external equipment mounted to the bracket.

18. A rolling stock assembly according to claim 16, wherein the joining member or at least one of the joining members is substantially planar, or includes at least one substantially planar portion and one, some or all of the planar joining member(s) or planar portion(s) of the joining member(s) are at a non-zero angle to the horizontal when the rolling stock is on flat, level ground.

19. A method for mounting external equipment to an underside of rolling stock, the method comprising fitting a bracket to the underside of the rolling stock, and fitting external equipment to the bracket, the bracket comprising first and second plates, a first set of apertures formed in at least one of the first and second plates for attachment of external equipment to the bracket and a second set of apertures formed in at least one of the first and second plates for attachment of the bracket to the underside of rolling stock, or to a component or system adapted to be mounted to the underside of rolling stock and the bracket further comprising at least one joining member disposed between the first and second plates; wherein the joining member(s) are joined to the first plate by a plurality of joints and joined to the second plate by a plurality of joints, wherein the joining member or at least one of the joining members is substantially planar, or includes at least one substantially planar portion.

20. A method for manufacturing a bracket for mounting external equipment to the underside of rolling stock, the method comprising the steps of a) providing a first plate and a second plate, and at least one joining member disposed between the first and second plates, b) locating protrusions of the at least one joining member within respective apertures provided in the first plate and the second plate, and c) attaching the protrusions to the first and second plates to form an assembled bracket.

21. A method according to claim 20, wherein attaching the protrusions to the first and second plates comprises deforming ends of the protrusions while the protrusions are located within their respective apertures to form riveted joints between the joining member(s) and the first plate and between the joining member(s) and the second plate.

* * * * *